United States Patent
Mue et al.

(10) Patent No.: US 7,137,804 B2
(45) Date of Patent: Nov. 21, 2006

(54) SYSTEM FOR ACTUATING A TWO PART MOULD FORMING TWO MUTUALLY ARTICULATED HALF-MOULDS

(75) Inventors: Claude Mue, Mery-sur-oise (FR); Patrick Trassard, Argenteuil (FR); Luc Dorin, Bolleville (FR)

(73) Assignee: ADS, Saint Ouen l'Amumône (FR)

( * ) Notice: Subject to any disclaimer, the term of this patent is extended or adjusted under 35 U.S.C. 154(b) by 313 days.

(21) Appl. No.: 10/478,304

(22) PCT Filed: Jun. 7, 2002

(86) PCT No.: PCT/FR02/01957

§ 371 (c)(1),
(2), (4) Date: Dec. 3, 2003

(87) PCT Pub. No.: WO02/100622

PCT Pub. Date: Dec. 19, 2002

(65) Prior Publication Data

US 2004/0151797 A1    Aug. 5, 2004

(30) Foreign Application Priority Data

Jun. 8, 2001    (FR) .................................. 01 07514

(51) Int. Cl.
B29C 33/26    (2006.01)

(52) U.S. Cl. ................ 425/451.4; 264/334; 425/451.5; 425/541; 425/592

(58) Field of Classification Search ................ 425/540, 425/541, 451.4, 451.5, 589, 592, DIG. 5; 264/523, 297.3, 334
See application file for complete search history.

(56) References Cited

U.S. PATENT DOCUMENTS

| 3,669,595 A | | 6/1972 | Zippel et al. |
|---|---|---|---|
| 3,685,943 A | * | 8/1972 | Fischer .................... 425/541 |
| 3,690,441 A | | 9/1972 | Zippel et al. |
| 3,854,857 A | | 12/1974 | Fischer et al. |
| 3,877,861 A | | 4/1975 | Kiefer et al. |
| 4,822,275 A | * | 4/1989 | Voss et al. ................. 425/541 |
| 5,064,366 A | * | 11/1991 | Voss .......................... 425/541 |
| 6,053,723 A | * | 4/2000 | Guiffant et al. .......... 425/451.4 |
| 6,805,548 B1 | * | 10/2004 | Evrard ....................... 425/541 |

FOREIGN PATENT DOCUMENTS

| FR | 2035405 | 12/1970 |
|---|---|---|
| FR | 2059446 | 5/1971 |
| FR | 2088523 | 1/1972 |
| FR | 2170075 | 9/1973 |
| FR | 2653058 | 4/1991 |
| FR | 2793722 | 11/2000 |

* cited by examiner

Primary Examiner—James P. Mackey
(74) Attorney, Agent, or Firm—Greenblum & Bernstein, P.L.C.

(57) ABSTRACT

Actuation system for opening and closing a two-part mold that includes first and second mold parts movably mounted to each other. The actuation system includes a carriage which can move in each of two directions, a first pivoting part coupled to the first mold part, a second pivoting part coupled to the second mold part, and at least one actuating member connected to each of the carriage and at least one of the first and second pivoting parts. This abstract is not intended to define the invention disclosed in the specification, nor intended to limit the scope of the invention in any way.

38 Claims, 3 Drawing Sheets

SYSTEM FOR ACTUATING A TWO PART MOULD FORMING TWO MUTUALLY ARTICULATED HALF-MOULDS

CROSS-REFERENCE TO RELATED APPLICATIONS

The present application is a National Stage Application of International Application No. PCT/FR02/01957, filed Jun. 7, 2002. Further, the present application claims priority under 35 U.S.C. § 119 of French Patent Application No. 0107514 filed on Jun. 8, 2001.

BACKGROUND OF THE INVENTION

1. Field of the Invention

The invention relates to an actuation system for a mold in two parts forming two half-molds articulated about an axis forming a hinge.

2. Discussion of Background Information

It is known how to make molds in two parts or half-molds, particularly for injection molding and blowing molding machines.

Each of the two half-molds is usually mounted on a carriage, and they are moved towards each other while remaining parallel to each other.

Systems in which the two half-molds are articulated about an axis forming a hinge and controlled between an open position and a closed position by a trolley free to move in translation in a forward-backward movement, as described in French patent documents 2 059 446 and 2 088 523 and in application FR-2 793 722, have also been known for a long time.

SUMMARY OF THE INVENTION

The invention relates to a system for the actuation of a two-part mold forming two half-molds of the type mentioned above, but which is remarkable in that each half-mold is also articulated on a part that pivots about an axis and that is moved in rotation by at least one actuation rod articulated by its ends to the said pivoting part and to the said carriage free to move in translation respectively.

According to one embodiment, each half-mold is articulated on the pivoting part by at least one connecting rod, whereas the actuation rods for the pivoting parts of the half-molds are articulated on a common translation carriage, and more particularly in the latter case, the translation carriage is for example composed of a cross piece that is installed free to slide on at least two rails and on which the actuation connecting rods are articulated.

Preferably, the translation carriage is moved forwards and backwards by at least one roller that cooperates with a cam and, for example, the roller may be placed on a connecting rod installed so as to pivot about an axis fixed with respect to the pivoting axes of the pivoting parts activating the half-mold.

Advantageously, when the half-molds are in the closed position, the longitudinal axes of the connecting rods installed between the said half-molds and the pivoting parts are approximately in line with each other along the line joining the pivoting axes of the said pivoting parts.

Due to this arrangement, the half-molds are naturally locked to each other when in the closed position without any other complementary devices.

The invention also relates to a set of molds each provided with an actuation system like that mentioned above, this assembly being remarkable in that the molds are arranged in a circle or along the arc of a circle and in that the translation carriages are moved by rollers that cooperate with a common cam, the said molds moving relative to the cam.

According to one embodiment, the molds are fixed on an element that rotates about the common cam that is fixed in position, but the invention also contemplates that the molds could be fixed and the cam could be moved in a rotary movement, i.e., the cam can rotate while the molds remain stationary.

The invention also provides for an actuation system for opening and closing a two-part mold comprising first and second mold parts movably mounted to each other, wherein the system comprises a carriage which can move in each of two directions, a first pivoting part coupled to the first mold part, a second pivoting part coupled to the second mold part, and at least one actuating member connected to each of the carriage and at least one of the first and second pivoting parts.

Movement of the carriage in one direction may cause the opening of the two-part mold and movement of the carriage in another direction may cause the closing of the two-part mold. The two-part mold may comprise two half-molds which are connected to each other via hinge. The first pivoting part may pivot about a first axis and the second pivoting part may pivot about a second pivot axis, the first and second pivot axes being arranged on opposite sides of the two-part mold. The carriage may be at least one of slidably mounted and capable of linear movement.

The system may further comprise a first connecting member connecting the first pivoting part to the first mold part. The system may further comprise a second connecting member connecting the second pivoting part to the second mold part. The at least one actuating member may comprise a first actuating member and a second actuating member, the first actuating member being connected to each of the carriage and the first pivoting part and the second actuating member being connected to each of the carriage and the second pivoting part. The at least one actuating member may comprise an actuating rod. The carriage may comprise a cross piece that is freely slidably mounted on at least two rails.

The system may further comprise a roller cam system adapted to move the carriage. The roller cam system may comprise a roller and a cam device, whereby, when the roller movably engages a surface of the cam device, the carriage is cause to move. The system may further comprise a connecting member that is movably mounted about an axis, wherein the axis of the connecting member is fixed relative to axes of the first and second pivoting parts.

The system may further comprise a first connecting member having one end that is movably connected to the first pivoting part about a first axis and another end that is movably connected to the first mold part about a second axis, and a second connecting member having one end that is movably connected the second pivoting part about a third axis and another end that is movably connected to the second mold part about a fourth axis, wherein, in the closing position, the first, second, third and fourth axes are approximately in line with each other.

The invention also provides for a mold system comprising a plurality of two-part molds each comprising first and second mold parts, a plurality of carriages which can move in each of two directions, a plurality of first pivoting parts each coupled to the first mold parts, a plurality of second pivoting parts each coupled to the second mold parts, a plurality of actuating members each connected to a respective carriage and a respective two-part mold, and a cam which causes movement of each carriage depending on a rotational position of the respective two-part mold relative to the cam.

The plurality of two-part molds may be arranged in one of a circular arrangement and a partial circular arrangement. The mold system may further comprise a plurality of roller each associated with a two-part mold, wherein each roller one of cooperates with and movably engages the cam. The plurality of two-part molds may rotate about an axis of the cam. The plurality of two-part molds may rotate around the cam. The plurality of two-part molds may rotate relative to the cam. The plurality of molds may be fixed on an element that rotates about the cam and wherein the cam is fixed in position.

The invention also provides for a system for opening and closing a two-part mold comprising first and second mold parts movably mounted to each other, wherein the system comprises a carriage slidably mounted to rails, a first pivoting part movably mounted to a first cylindrical member, a second pivoting part movably mounted to a second cylindrical member, a first connecting member connecting the first pivoting part to the first mold part, a second connecting member connecting the second pivoting part to the second mold part, a first actuating member connected to each of the carriage and the first pivoting part, and a second actuating member connected to each of the carriage and the second pivoting part, wherein movement of the carriage in one direction causes the opening of the two-part mold and wherein movement of the carriage in another direction causes the closing of the two-part mold.

The two-part mold may comprise two half-molds which are connected to each other via hinge. The first pivoting part may pivot about a first axis and the second pivoting part may pivot about a second pivot axis, and the first and second pivot axes may be arranged on opposite sides of the two-part mold. Each of the first and second actuating members may comprise an actuating rod.

The system may further comprise a roller cam system adapted to move the carriage. The roller cam system may comprise a roller and a cam device, whereby, when the roller movably engages a surface of the cam device, the carriage is cause to move. The system may further comprise a connecting member having a roller, wherein the connecting member is movably mounted about an axis, and wherein the axis of the connecting member is fixed relative to axes of the first and second pivoting parts. The first connecting member may have one end that is movably connected to the first pivoting part about a first axis and another end that is movably connected to the first mold part about a second axis, the second connecting member may have one end that is movably connected the second pivoting part about a third axis and another end that is movably connected to the second mold part about a fourth axis, and, in the closing position, the first, second, third and fourth axes may be approximately in line with each other.

The invention also provides for a mold system utilizing the system described above and further comprising a roller cam system adapted to move the carriage, wherein the roller cam system comprises a roller and a cam device, whereby, when the roller movably engages a surface of the cam device, the carriage is cause to move.

The two-part mold may be one mold of a plurality of two-part molds arranged in one of a circular arrangement and a partial circular arrangement. The plurality of two-part molds may rotate about an axis of the cam. The plurality of two-part molds may rotate around the cam. The plurality of two-part molds may rotate relative to the cam. The plurality of molds may be fixed on an element that rotates about the cam and the cam may be fixed in position.

The invention also provides for a method of opening and closing a two-part mold utilizing the actuation system described above, wherein the method comprises moving the carriage in a first direction to cause the first and second pivoting parts to rotate in towards the two-part mold and moving the carriage in a second direction to cause the first and second pivoting parts to rotate in away from the two-part mold, wherein rotation in the first direction causes edges of the first and second mold parts to move towards each other until the two-part mold reaches a closed position, and wherein rotation in the second direction causes the edges of the first and second mold parts to move away from each other until the two-part mold reaches an open position.

The invention also provides for a method of opening and closing a plurality of two-part molds utilizing the mold system described above, wherein the method comprises rotating the plurality of two-part molds relative to the cam and causing at least one of the plurality of carriages to move using with the cam.

The invention also provides for a method of opening and closing a two-part mold utilizing the actuation system described above, wherein the method comprises moving the carriage in a first direction to cause the first and second pivoting parts to rotate in towards the two-part mold and moving the carriage in a second direction to cause the first and second pivoting parts to rotate in away from the two-part mold, wherein rotation in the first direction causes edges of the first and second mold parts to move towards each other until the two-part mold reaches a closed position, and wherein rotation in the second direction causes the edges of the first and second mold parts to move away from each other until the two-part mold reaches an open position.

The invention also provides for a method of opening and closing a plurality of two-part molds utilizing the mold system described above, wherein the method comprises rotating the two-part mold relative to the cam device and causing the carriages to move using with the cam device.

BRIEF DESCRIPTION OF THE DRAWINGS

The invention will be better understood after reading the following description with reference to the attached drawings wherein.

DETAILED DESCRIPTION OF THE PREFERRED EMBODIMENTS

Figure 1:
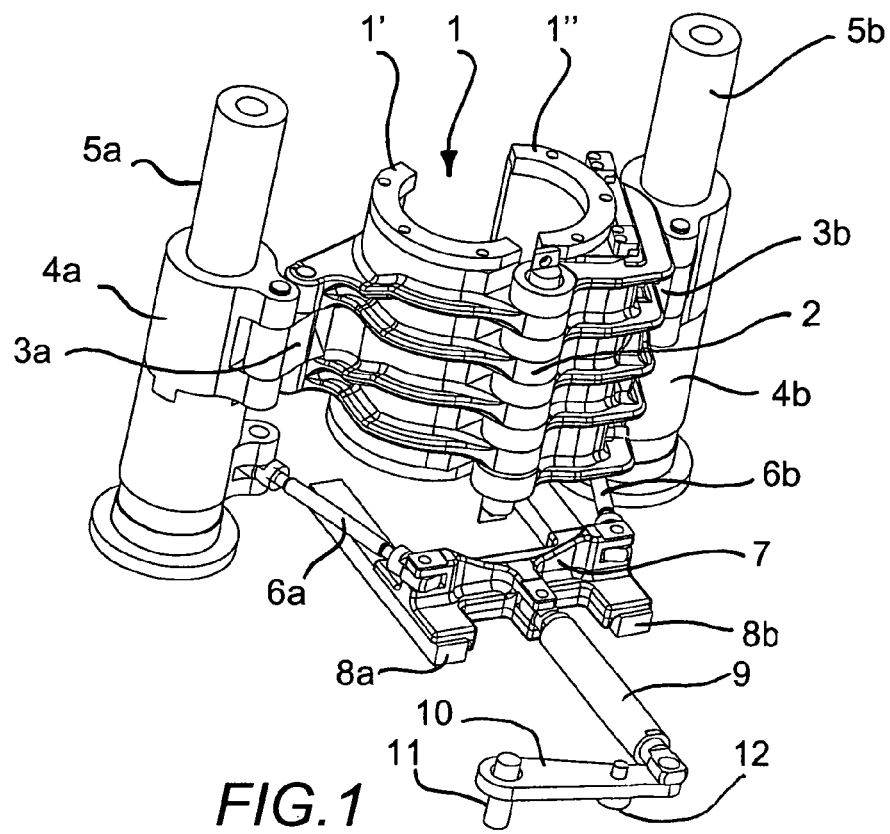
FIGS. 1 and 2 show a perspective view of a system according to the invention, the mold being shown in the open and closed positions respectively.

As shown on the drawings, the system according to the invention will actuate a mold 1. The mold 1 is arranged in two parts forming two half-moulds 1', 1" which are articulated to (i.e., movably connected to) each other about an axis 2 forming a hinge.

Each half-mould 1', 1" is articulated and/or movably connected to respective pivoting parts 4a, 4b. This connection occurs through a connecting rod 3a, 3b whose one end is connected to parts 4a, 4b and whose other end is connected to half-molds 1', 1". The pivoting parts 4a, 4b are movably installed and/or mounted to members 5a, 5b and are each free to pivot about an axis of members 5a, 5b.

The pivoting parts 4a, 4b are each moved in rotation about members 5a, 5b by an actuation rod 6a, 6b. The rods 6a, 6b have one end that is articulated and/or connected to the parts 4a, 4b and another end connected to a translation carriage 7.

The carriage 7 consists of a cross piece that is installed so as to be free to slide on two rails 8a, 8b. One of the ends of the actuation rods 6a, 6b is articulated and/or connected to the carriage 7 and another of the ends of the rods 6a, 6b is connected to the pivoting parts 4a, 4b.

Figure 2:
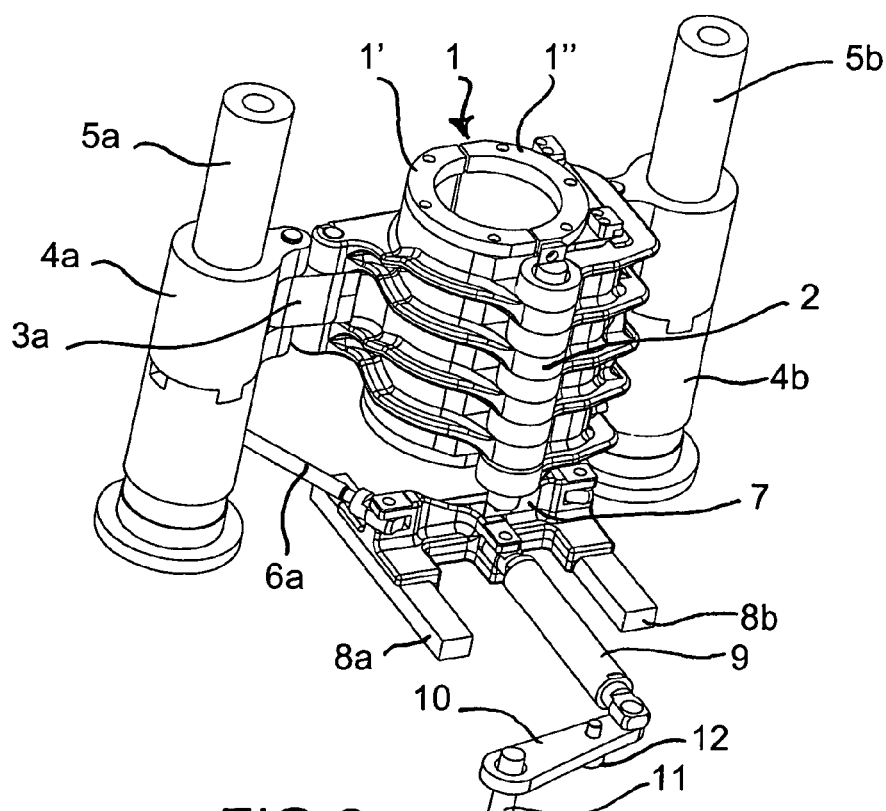
Figure 3:
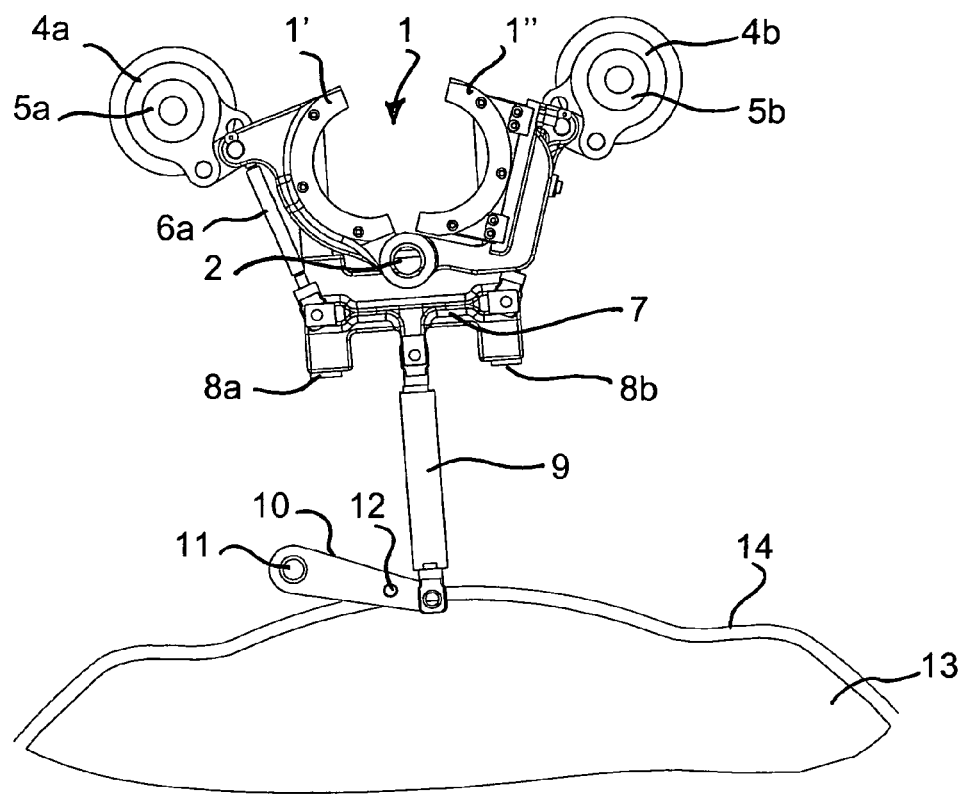
FIGS. 3 and 4 show a top view of the systems in FIGS. 1 and 2 respectively, also partly showing the actuation cam.
Figure 4:
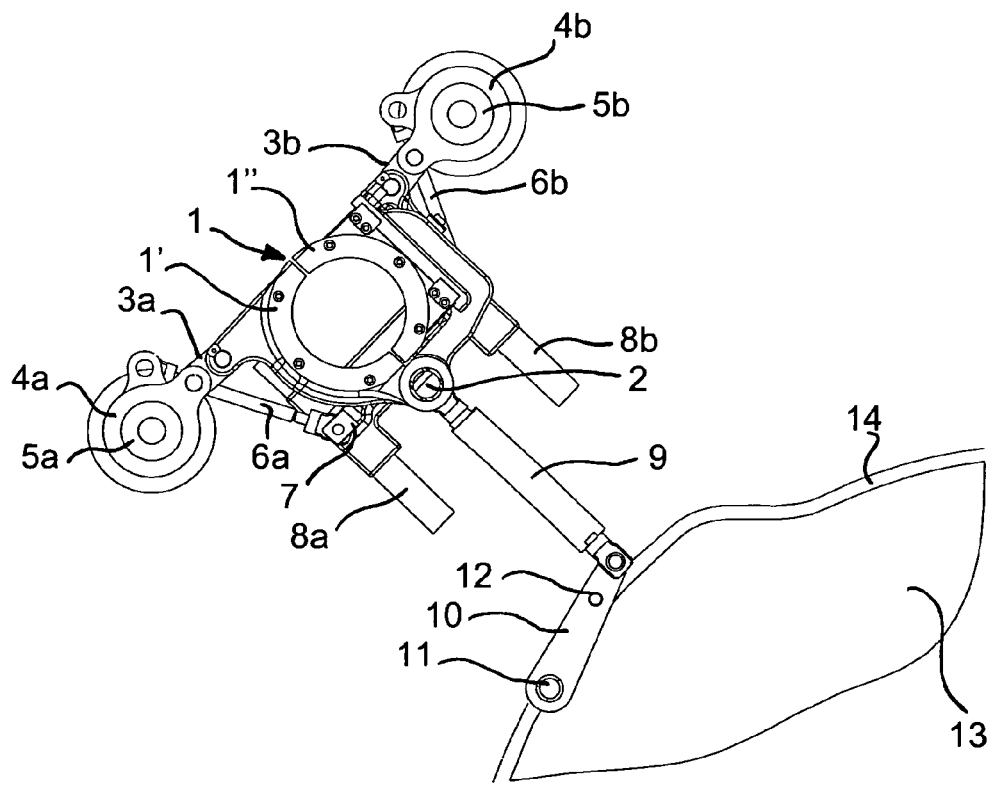

In this way, it can be understood that with a forward-backward movement of the carriage 7 (i.e., forwards and backwards sliding movement on rails 8a, 8b), the assembly moves from the open position (i.e., open half-molds 1', 1") shown in FIGS. 1 and 3 to the corresponding closed position (i.e., closed half-molds 1', 1") shown in FIGS. 2 and 4 and vice versa.

Translation and/or movement of the carriage 7 causes a corresponding pivoting of parts 4a, 4b, by way of the connecting rods 6a, 6b, and thus closes and then opens the molds through the action of the connecting rods 3a, 3b on the half-molds 1', 1". The pivoting axes 2, 5a and 5b are fixed with respect to the movement of the carriage 7.

An articulating push and pull rod 9 is connected to the carriage and to a connecting rod 12. As can be seen in FIG. 1, one end of the rod 9 is movably connected to the carriage 7 and another end of the rod 9 is movably connected to the connecting rod 10. The connecting rod 10 is free to pivot about an axis 11 and is provided with a roller 12 in order to move the carriage 7. The axis 11 is fixed with respect to axes 5a, 5b about which parts 4a, 4b pivot.

The roller 12 cooperates and/or movably engages with a cam 13 shown partially in FIGS. 3 and 4.

Depending on the position of the roller 12 on the cam 13, it can be seen that the mold may be open (FIG. 3) or closed (FIG. 4), since the roller follows the path 14 shown in FIGS. 3 and 4.

The roller 12 and the cam 13 must have a relative movement with respect to each other. For example, the cam 13 can be arranged to move with respect to the support of mold 1 formed by the axes 5a, 5b and 2 which are then fixed. Alternatively, the entire mold and its actuation system can be arranged to move with respect to the cam 13 which is then fixed.

As shown in particular in FIGS. 2 and 4, in the closed position the longitudinal axes of the connecting rods 3a, 3b are approximately in line with each other along the line between the pivot axes 5a, 5b of the pivoting parts 4a, 4b, or the said axes 5a, 5b are approximately in the same plane as the plane containing the articulation axes of the connecting rods 3a, 3b.

In this position, the articulation axes of the connecting rods 3a, 3b with the pivoting parts 4a, 4b may be slightly beyond the line connecting the pivot axes 5a, 5b.

In this way, the mold is held partly locked by the pressure applied by the carriage, but also by the geometry of the system that opposes opening without deliberate backward movement of the carriage 7.

Figure 5:
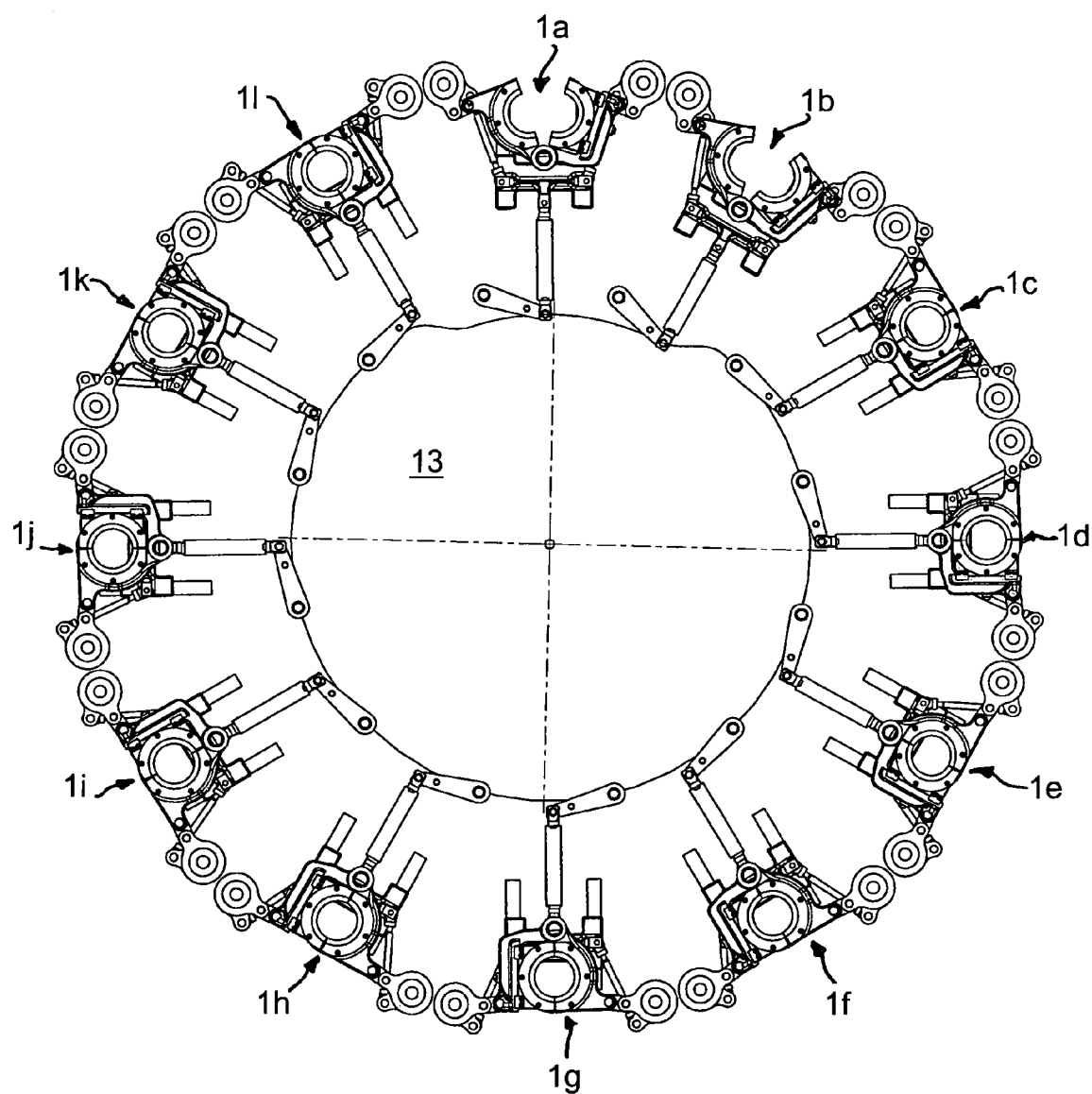
FIG. 5 shows a top view of a set of several moulds each provided with an actuation system controlled by a common cam.

FIG. 5 shows a set of twelve molds 1a to 11 each provided with an actuation system like that described with reference to FIGS. 1 to 4, and for example this assembly being used to blow hollow bodies such as bottles, from thermoplastic preforms.

Molds 1a to 11 are arranged as shown in FIG. 5, around a circle at the center of which there is a common cam 13, in this case fixed.

The previously described pivot axes references 2, 5a, 5b, and the pivot axes 11 of the connecting rods 10, and obviously also the rails 8a, 8b on which the carriages 7 are free to move, are fixed, for example on a plate not shown that is free to rotate with respect to the cam 13 (although obviously, it would be possible to imagine a mobile cam and fixed molds).

The shape of the cam is designed and chosen so that one or several molds open (1a, 1b) or close (1c to 11) as shown in the said FIG. 5, as a function of the angular position of the cam 13.

The invention claimed is:

1. An actuation system for opening and closing a two-part mold comprising first and second mold parts movably mounted to each other, the system comprising:
    a carriage which can move in each of two directions;
    a first pivoting part coupled to the first mold part;
    a second pivoting part coupled to the second mold part; and
    first and second actuating members connected to each of the carriage and the first and second pivoting parts,
    wherein the first actuating member is pivotally mounted to the carriage about a first axis and the second actuating member is pivotally mounted to the carriage about a second different axis.

2. The system of claim 1, wherein movement of the carriage in one direction causes movement of the two-part mold to an open position and wherein movement of the carriage in another direction causes movement of the two-part mold to a closed position.

3. The system of claim 1, wherein the two-part mold comprises two half-molds which are connected to each other via hinge.

4. The system of claim 1, wherein the first pivoting part pivots about a first axis and the second pivoting part pivots about a second pivot axis, the first and second pivot axes being arranged on opposite sides of the two-part mold.

5. The system of claim 1, wherein the carriage is at least one of slidably mounted and capable of linear movement.

6. The system of claim 1, further comprising a first connecting member connecting the first pivoting part to the first mold part.

7. The system of claim 6, further comprising a second connecting member connecting the second pivoting part to the second mold part.

8. The system of claim 1, wherein the first and second actuating members each comprises an actuating rod.

9. The system of claim 1, wherein the carriage comprises a cross piece that is freely slidably mounted on at least two rails.

10. The system of claim 1, further comprising a roller cam system adapted to move the carriage.

11. The system of claim 10, wherein the roller cam system comprises a roller and a cam device, whereby, when the roller movably engages a surface of the cam device, the carriage is cause to move.

12. The system of claim 1, further comprising a connecting member that is structured and arranged to move the carriage and that is movably mounted about an axis, wherein the axis of the connecting member is fixed relative to axes of the first and second pivoting parts.

13. An actuation system for opening and closing a two-part mold comprising first and second mold parts movably mounted to each other, the system comprising:

a carriage which can move in each of two directions;
a first pivoting part coupled to the first mold part;
a second pivoting part coupled to the second mold part;
at least one actuating member connected to each of the carriage and at least one of the first and second pivoting parts;
a first connecting member having one end that is movably connected to the first pivoting part about a first axis and another end that is movably connected to the first mold part about a second axis; and
a second connecting member having one end that is movably connected the second pivoting part about a third axis and another end that is movably connected to the second mold part about a fourth axis,
wherein, in the closing position, the first, second, third and fourth axes are approximately in line with each other.

14. A mold system comprising:
a plurality of two-part molds each comprising first and second mold parts;
a plurality of carriages which can move in each of two directions;
a plurality of first pivoting parts each coupled to the first mold parts;
a plurality of second pivoting parts each coupled to the second mold parts;
a plurality of actuating members each connected to a respective carriage and a respective two-part mold; and
a cam which causes movement of each carriage depending on a rotational position of the respective two-part mold relative to the cam.

15. The mold system of claim 14, wherein the plurality of two-part molds are arranged in either a circular arrangement or a partial circular arrangement.

16. The mold system of claim 14, further comprising a plurality of roller each associated with a two-part mold, wherein each roller one of cooperates with and movably engages the cam.

17. The mold system of claim 14, wherein the plurality of two-part molds rotate about an axis of the cam.

18. The mold system of claim 14, wherein the plurality of two-part molds rotate around the cam.

19. The mold system of claim 14, wherein the plurality of two-part molds rotate relative to the cam.

20. The mold system of claim 14, wherein the plurality of molds are fixed on an element that rotates about the cam and wherein the cam is fixed in position.

21. A system for opening and closing a two-part mold comprising first and second mold parts movably mounted to each other, the system comprising:
a carriage slidably mounted to rails;
a first pivoting part movably mounted to a first cylindrical member;
a second pivoting part movably mounted to a second cylindrical member;
a first connecting member connecting the first pivoting part to the first mold part;
a second connecting member connecting the second pivoting part to the second mold part;
a first actuating member connected to each of the carriage and the first pivoting part;
a second actuating member connected to each of the carriage and the second pivoting part;
the first actuating member being pivotally mounted to the carriage about a first axis; and
the second actuating member is pivotally mounted to the carriage about a second different axis,
wherein movement of the carriage in one direction causes the opening of the two-part mold and wherein movement of the carriage in another direction causes the closing of the two-part mold.

22. The system of claim 21, wherein the two-part mold comprises two half-molds which are connected to each other via hinge.

23. The system of claim 21, wherein the first pivoting part pivots about a first axis and the second pivoting part pivots about a second pivot axis, the first and second pivot axes being arranged on opposite sides of the two-part mold.

24. The system of claim 21, wherein each of the first and second actuating members comprises an actuating rod.

25. The system of claim 21, further comprising a roller cam system adapted to move the carriage.

26. The system of claim 25, wherein the roller cam system comprises a roller and a cam device, whereby, when the roller movably engages a surface of the cam device, the carriage is cause to move.

27. The system of claim 21, further comprising a connecting member having a roller, wherein the connecting member is structured and arranged to move the carriage and is movably mounted about an axis, and wherein the axis of the connecting member is fixed relative to axes of the first and second pivoting parts.

28. A system for opening and closing a two-part mold comprising first and second mold parts movably mounted to each other, the system comprising:
a carriage slidably mounted to rails;
a first pivoting part movably mounted to a first cylindrical member;
a second pivoting part movably mounted to a second cylindrical member;
a first connecting member connecting the first pivoting part to the first mold part;
a second connecting member connecting the second pivoting part to the second mold part;
a first actuating member connected to each of the carriage and the first pivoting part; and
a second actuating member connected to each of the carriage and the second pivoting part,
wherein movement of the carriage in one direction causes the opening of the two-part mold and wherein movement of the carriage in another direction causes the closing of the two-part mold, and
wherein the first connecting member has one end that is movably connected to the first pivoting part about a first axis and another end that is movably connected to the first mold part about a second axis, wherein the second connecting member has one end that is movably connected the second pivoting part about a third axis and another end that is movably connected to the second mold part about a fourth axis, and wherein, in the closing position, the first, second, third and fourth axes are approximately in line with each other.

29. A mold system utilizing the system of claim 21 and further comprising:
a roller cam system adapted to move the carriage,
wherein the roller cam system comprises a roller and a cam device, whereby, when the roller movably engages a surface of the cam device, the carriage is cause to move.

30. The mold system of claim 29, wherein the two-part mold is one mold of a plurality of two-part molds arranged in either a circular arrangement or a partial circular arrangement.

31. The mold system of claim 30, wherein the plurality of two-part molds rotate about an axis of the cam.

32. The mold system of claim 30, wherein the plurality of two-part molds rotate around the cam.

33. The mold system of claim 30, wherein the plurality of two-part molds rotate relative to the cam.

34. The mold system of claim 30, wherein the plurality of molds are fixed on an element that rotates about the cam and wherein the cam is fixed in position.

35. A method of opening and closing a two-part mold utilizing the actuation system of claim 1, the method comprising:
   moving the carriage in a first direction to cause the first and second pivoting parts to rotate in towards the two-part mold; and
   moving the carriage in a second direction to cause the first and second pivoting parts to rotate in away from the two-part mold,
   wherein rotation in the first direction causes edges of the first and second mold parts to move towards each other until the two-part mold reaches a closed position, and
   wherein rotation in the second direction causes the edges of the first and second mold parts to move away from each other until the two-part mold reaches an open position.

36. A method of opening and closing a plurality of two-part molds utilizing the mold system of claim 14, the method comprising:
   rotating the plurality of two-part molds relative to the cam; and
   causing at least one of the plurality of carriages to move with the cam.

37. A method of opening and closing a two-part mold utilizing the actuation system of claim 21, the method comprising:
   moving the carriage in a first direction to cause the first and second pivoting parts to rotate in towards the two-part mold; and
   moving the carriage in a second direction to cause the first and second pivoting parts to rotate in away from the two-part mold,
   wherein rotation in the first direction causes edges of the first and second mold parts to move towards each other until the two-part mold reaches a closed position, and
   wherein rotation in the second direction causes the edges of the first and second mold parts to move away from each other until the two-part mold reaches an open position.

38. A method of opening and closing a plurality of two-part molds utilizing the mold system of claim 29, the method comprising:
   rotating the two-part mold relative to the cam device; and
   causing the carriage to move with the cam device.

* * * * *